US009580190B1

(12) United States Patent
Spence et al.

(10) Patent No.: US 9,580,190 B1
(45) Date of Patent: Feb. 28, 2017

(54) DEPLOYABLE ROOT STIFFNESS MECHANISM FOR TUBULAR SLIT BOOMS AND METHOD FOR INCREASING THE BENDING AND TORSIONAL STIFFNESS OF A TUBULAR SLIT BOOM

(71) Applicant: Deployable Space Systems, Inc., Goleta, CA (US)

(72) Inventors: Brian R Spence, Solvang, CA (US); Stephen F White, Ventura, CA (US); Mark Douglas, Santa Barbara, CA (US)

(73) Assignee: Deployable Space Systems, Santa Barbara, CA (US)

(*) Notice: Subject to any disclaimer, the term of this patent is extended or adjusted under 35 U.S.C. 154(b) by 0 days.

(21) Appl. No.: 14/738,860

(22) Filed: Jun. 13, 2015

Related U.S. Application Data

(60) Provisional application No. 62/012,574, filed on Jun. 16, 2014.

(51) Int. Cl.
*B64G 1/22* (2006.01)
*B64G 1/10* (2006.01)

(52) U.S. Cl.
CPC ............ *B64G 1/222* (2013.01); *B64G 1/10* (2013.01)

(58) Field of Classification Search
CPC . B64G 1/22; B64G 1/222; B64G 1/44; B64G 1/443; B64G 1/446; H02S 30/20; H02S 20/00; E04C 3/005
USPC ............................................. 244/172.6, 172.7
See application file for complete search history.

(56) References Cited

U.S. PATENT DOCUMENTS

| 3,589,632 | A | * | 6/1971 | Rew | B21C 47/003 188/82.84 |
| 8,683,755 | B1 | * | 4/2014 | Spence | B64G 1/222 136/245 |
| 2011/0210209 | A1 | * | 9/2011 | Taylor | B64G 1/222 244/172.6 |
| 2015/0259911 | A1 | * | 9/2015 | Freebury | E04C 3/005 52/108 |

* cited by examiner

*Primary Examiner* — Richard G Davis
(74) *Attorney, Agent, or Firm* — James M. Duncan, Esq.; Klein DeNatale Goldner

(57) ABSTRACT

A deployable root stiffness mechanism and method increases the bending and torsional stiffness and strength of a tubular slit boom while allowing the slit boom to be flattened and rolled to a compact stowage volume. The slit booms may be flattened and rolled into a compact cylindrical stowage volume and once released, elastically and immediately deploy from the rolled stowed configuration to the final structural tube shape. An embodiment of the disclosed apparatus comprises a base member which is engaging contact with a bottom surface of the tubular slit boom and a reaction member which translates along the base member as the tubular slit boom transitions between the storage configuration to the deployed configuration and between the deployed configuration to the storage configuration. The reaction member provides an opposing reactive force to a load conveyed through the thin-wall construction of the boom. The method provides a means for increasing the bending and torsional stiffness and strength of a tubular slit boom by reacting external loads through the boom walls into a structure which generally conforms to the shape of the boom as it is deployed.

12 Claims, 5 Drawing Sheets

DEPLOYABLE ROOT STIFFNESS MECHANISM FOR TUBULAR SLIT BOOMS AND METHOD FOR INCREASING THE BENDING AND TORSIONAL STIFFNESS OF A TUBULAR SLIT BOOM

RELATED APPLICATIONS

U.S. Application No. 62/012,574 for this invention was filed on Jun. 16, 2014, for which application these inventors claim domestic priority, and which application is incorporated in its entirety.

BACKGROUND OF THE INVENTION

The present invention generally relates to deployable space structures and booms and more specifically provides structural support to tubular open-section boom systems.

Spacecraft systems, which include earth and planetary orbiting satellites and deep space probes, often incorporate deployable systems which include deployable structures, deployable solar arrays, deployable antennas, and other deployable subsystems. These deployable systems must be configurable between a storage configuration that enables the entire spacecraft system, inclusive of the deployable structure, to fit within the small volume constraints of a launch vehicle, and a deployed operable configuration that enables the spacecraft to function in a desired manner once in space.

Once the spacecraft is in space, the spacecraft is typically configured for use by deploying an assembly of extendable deployable components. For example, the assembly of extendable components may comprise an extended solar panel or blanket array that is used to convert collected solar radiation into electrical energy. In another example, the assembly of extendable components may comprise an extendable antenna assembly that is used to transmit and receive electromagnetic signals to and from a plurality of earth-based installations. In yet another example, the assembly of extendable components may comprise an extendable boom assembly that is used as a platform for a critical sensor, such as a magnetometer or electric field sensor.

The deployable boom assemblies are required to compactly stow into a small volume and then reliably deploy in a known kinematic manner to form a rigid and strong appendage of the spacecraft. The boom assemblies must also be lightweight so they can be launched into space, and low cost so they can be affordable to the program. Further complicating the design of these devices, emerging space missions require deployable systems of increased size and load-carrying capability while minimizing program costs.

One type of deployable boom assembly comprises a metallic tubular slit boom. Metallic tubular slit booms have been used in the space industry to deploy sensors and in some cases as structural elements within a larger deployable system. Due to the open-section nature of the tubular slit boom accompanied by the characteristic base mounting of the tube to the spacecraft, a linear or near-linear pattern of fasteners opposite the tube slit have been typically used for applications with lower loads and orbital accelerations. Recently, slit booms of composite reinforced construction have been developed that offer increases in deployment force, torque and thermal stability. However, the thin-wall nature of the metallic or composite reinforced slit boom and localized bending of the tube forward of the conventional base mount limits the bending load-carrying capability of the slit tube. In addition, the standard boom mounting allows the free edges of the slit boom to translate relative to each other when a torsional load is applied to the boom tip significantly reducing the torsional stiffness of the boom.

Various approaches have been utilized to address these issues. At the system level, slit booms may be used effectively in pairs so that they are loaded primarily in bending due to the low torsional stiffness of each individual boom. For higher load applications, open lattice, articulated or potentially telescoping booms are used. These boom types are comprised of multiple and complex deploying elements that are arranged in a repetitive manner to form a boom of desired length. However, the open lattice, articulated and telescoping boom technologies are high cost and labor intensive to manufacture. They consist of a large number of moving parts that may inherently reduce the deployment reliability of the boom system. As increasingly advanced types of spacecraft are being developed, it has become apparent that currently boom technologies are insufficient for meeting emerging applications in terms of cost, reliability, stiffness and strength.

SUMMARY OF THE INVENTION

Embodiments of the present invention address the problems identified above. Embodiments of the present invention provide a stowable and deployable root stiffness mechanism which maximizes the structural performance of a slit boom.

Embodiments of the present invention will provide a deployable mechanism which captures the base of the rollout boom during deployment as the rollout boom transitions from a flat rolled configuration to an extended tubular configuration. An embodiment of the root stiffness mechanism may comprise: (1) a baseplate that serves as a structural interface of the boom assembly to the spacecraft or other system level structural component; (2) side plates that interface both the base plate and boom side walls; (3) boom attachment strips that help distribute the loads applied to the boom into the side plates; and (4) spring elements, or other biasing mechanisms, are attached to the lower edge of each side plate which elements erect and preload the side plates as the boom deploys from a flattened, rolled state to a tubular state.

In one embodiment, the base plate may have integral slotted features that interface with the deployable side plates. The slit boom may be attached to the base plate opposite the slit using a series of fasteners arranged in a linear or near-linear pattern. The lower edges of the side plates interface the base and are constrained so as to translate within the slots of the base plate. The upper surface of each side plate will typically contact the outer surface of the slit boom at approximately mid-level. It is to be appreciated that the base plate and side plates serve to conform to the changing geometry of the slit boom as it deploys, thus capturing and supporting the end of the slit boom.

In another embodiment, a boom attachment strip may contact the inner surface of the slit boom directly opposite the corresponding side plate. The boom attachment strip may be bonded to the inner surface of the slit boom as required. Redundant mechanical fasteners may pass through each side plate and corresponding holes in the boom wall, threading into the boom attachment strips to secure each side plate to the boom wall. Springs, constant force or other, or other biasing mechanisms (collectively referred to hereinafter simply as "springs") are fixed to the base plate and apply a load to the lower edge of each side plate. In this embodiment, with reference to the orientation generally depicted in the figures, the springs deploy the side plates to a vertical orientation (i.e., generally perpendicular to the base plate) as the boom deploys, as a result of the boom's stored strain energy, from a flattened state to a tubular state. The springs preload each side plate against the end of the corresponding base plate slot. If additional latching is desired, other latching mechanisms may be employed, such as simple leaf spring latches which may be attached to the base plate to preload and latch the lower edge of each side plate once the side plate reaches its deployed upright position.

The unique kinematics of the root stiffness mechanism allow the side plates to stow neatly behind the slit boom as the boom is flattened and rolled from the boom tip to a compact cylindrical configuration. During boom deployment the side plates, activated by the springs or other biasing mechanisms, achieve a vertical orientation and preload against structural stopping mechanisms in the base plate, such as slots.

The root stiffness mechanism greatly increases the bending stiffness and strength of a slit boom over conventional boom mounting methods by reacting external loads through the boom walls into the side plates and the base plate. In addition, the root stiffness mechanism increases the torsional stiffness of the boom by resisting shearing of the boom free edges adjacent to the slot. The root stiffness mechanism may be used in conjunction with any number of closeout methods of the boom edges and boom tip to further enhance the boom system structural performance.

An embodiment of the disclosed method comprises the steps of increasing of the bending and torsional stiffness and strength of a tubular slit boom by the reacting of external loads through the boom walls into a capturing structure, such as one having deploying side plates and an associated base plate as the boom is deployed, or other structural supports which provide the reacting of the external loads through the booms walls into a capturing structure, where the capturing structure generally conforms to the geometry of the tubular slit boom as it changes from a stowed flat sheet structure in a rolled configuration to a deployed tubular structure.

Emerging space missions require deployable systems of increased size and load-carrying capability while minimizing program costs. By implementing the root stiffness mechanism described herein, metallic and composite reinforced tubular slit booms may be used to meet stringent mission structural requirements. Tubular slit booms offer cost savings, reduced complexity and higher reliability over the existing open lattice, articulated and telescoping boom technologies. An embodiment of the disclosed base mechanism allows tubular slit booms to be used for higher load and stiffness applications reducing costs and providing structural enhancements over existing boom technologies.

DETAILED DESCRIPTION OF THE EMBODIMENTS

Figure 1:
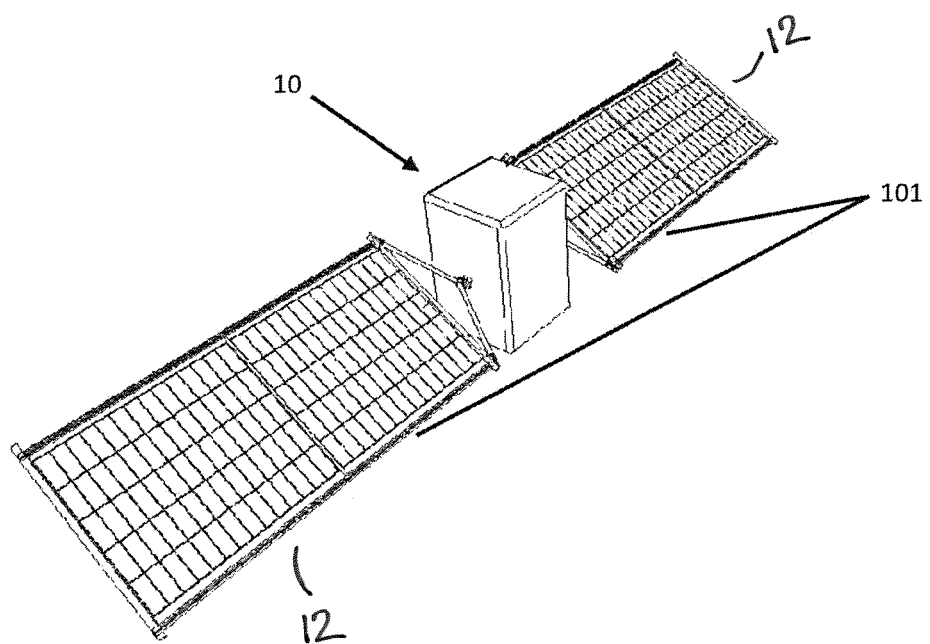
FIG. 1 depicts an example of a spacecraft having an onboard system—solar panels in the case of this example—in which the onboard system is deployed by tubular slit booms.
Figure 2:
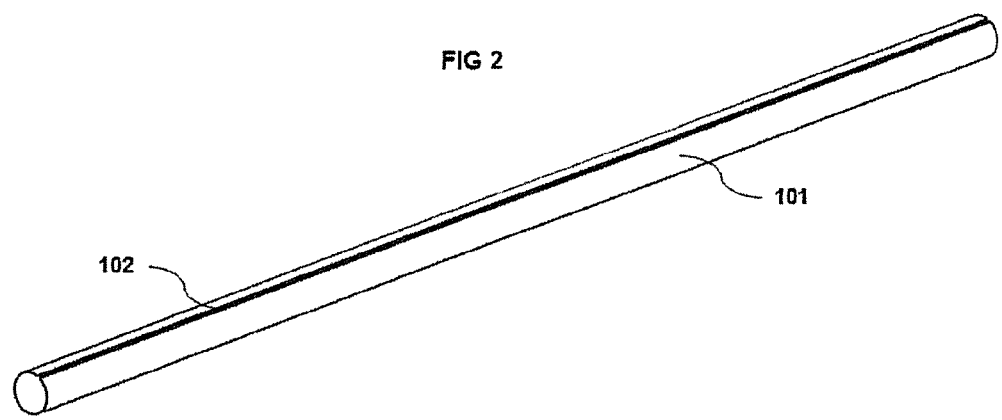
FIG. 2 shows a perspective view of an embodiment of a fully deployed tubular slit boom.

Referring now to the Figures, FIG. 1 shows an example of a spacecraft 10 which deploys an onboard system, such as solar panels 12, which are deployed on tubular slit booms 101. FIG. 2 shows a perspective view of an embodiment of a fully deployed tubular slit boom 101. Tubular slit boom 101 is an elastically deployable, thin-walled, metal or composite reinforced tubular boom with a slit 102 along its length to allow the boom to be flattened and rolled from one end into a cylindrical stowage volume.

Figure 3:
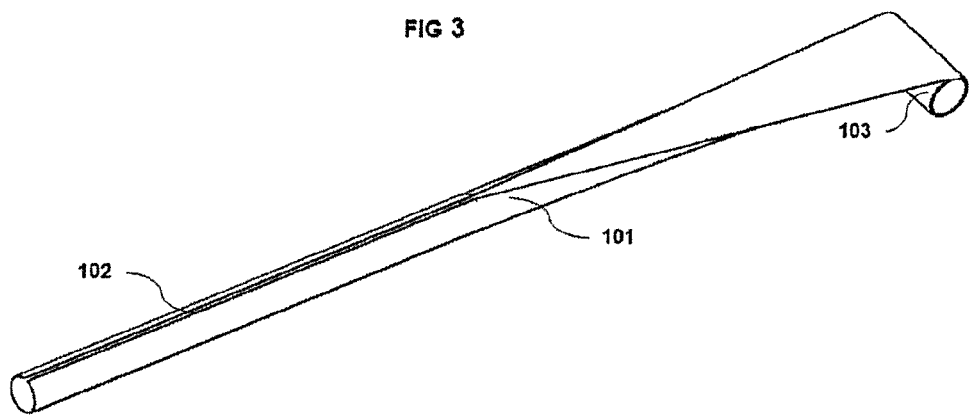
FIG. 3 shows a perspective view of an embodiment of a partially deployed tubular slit boom.

FIG. 3 shows a perspective view of an embodiment of a partially deployed tubular slit boom 101. The tip of the boom 101 has been flattened and rolled to achieve a cylindrical stowed boom segment 103. The slit 102 allows the boom 101 to be flattened and subsequently rolled back into a stowable configuration.

Figure 4:
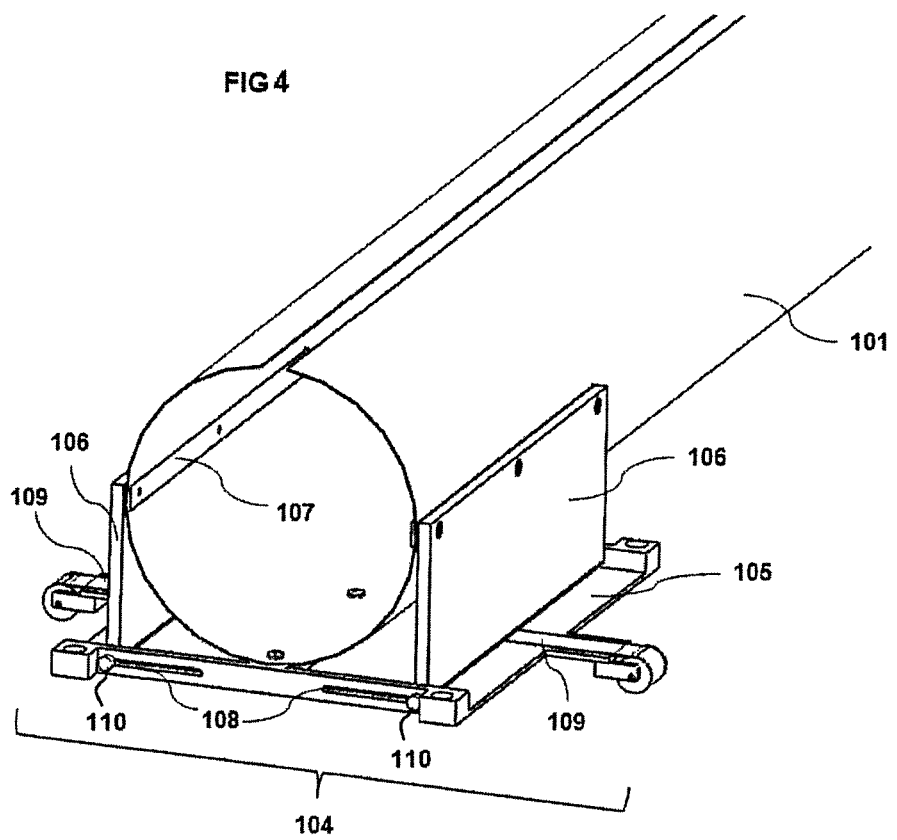
FIG. 4 shows a detailed perspective view of an embodiment of the deployable root stiff mechanism in the deployed position.
Figure 7:
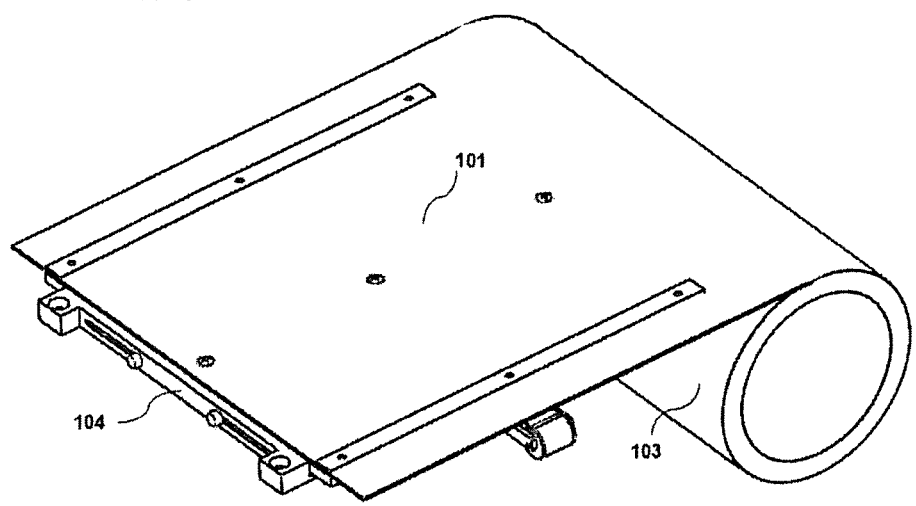
FIG. 7 shows a perspective view of an embodiment of a near fully stowed deployed tubular slit boom with an embodiment of the disclosed apparatus attached at the boom base.

FIG. 4 shows a detailed perspective view of an embodiment of the deployable root stiffness mechanism 104. The root stiffness mechanism 104 greatly enhances the bending and torsional stiffness and strength of the deployed boom 101, while embodiments of the device will generally have the added advantage of stowing neatly and compactly behind the boom 101 as the boom is flattened and rolled into a compact cylindrical stowage volume such as generally depicted in FIG. 7. The root stiffness mechanism 104 comprises a base plate 105 which serves as the structural interface of the boom assembly to the spacecraft or other system level structural component.

Figure 6:
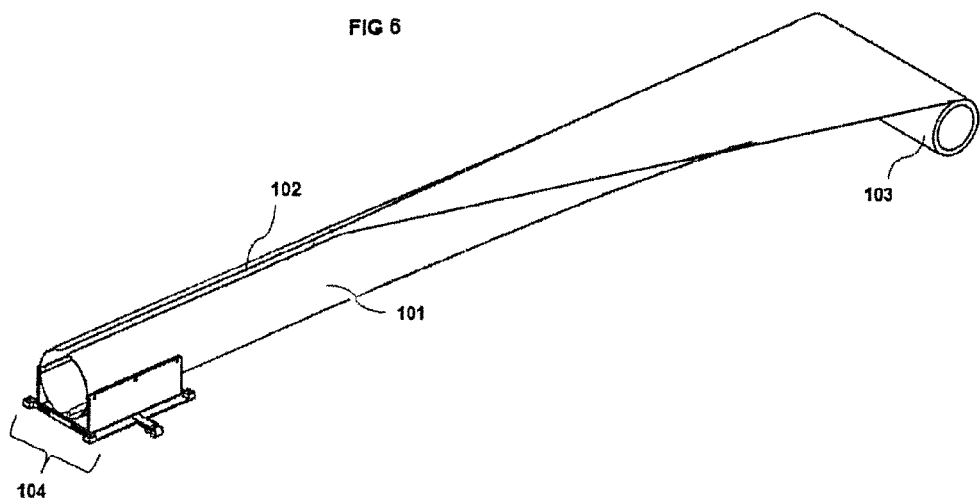
FIG. 6 shows a perspective view of an embodiment of a partially deployed tubular slit tube boom with an embodiment of the disclosed apparatus attached at the boom base.

The root stiff mechanism 104 may also comprise side plates 106 which interface the base plate 105 and the side walls of the boom 101. Boom attachment strips 107 may function as part of the system by helping to distribute the loads applied to the boom 101 into the side plates 106. The root stiff mechanism may also comprise biasing mechanism, such as spring elements 109 which may be attached, among other locations, to the lower edge of each side plate 106, there the spring elements 109 erect and preload the side plates as the boom 101 deploys from a flattened, rolled state, as generally depicted in FIG. 6. As indicated in FIG. 4, the lower edges of the side plates 106 are generally constrained with respect to base plate 105 as the boom 101 and root stiffness mechanism 104 are flattened during storage. Such constraint may be achieved by the side plates comprising pins 110 which translate within slots 108 of the base plate 105.

Figure 5:
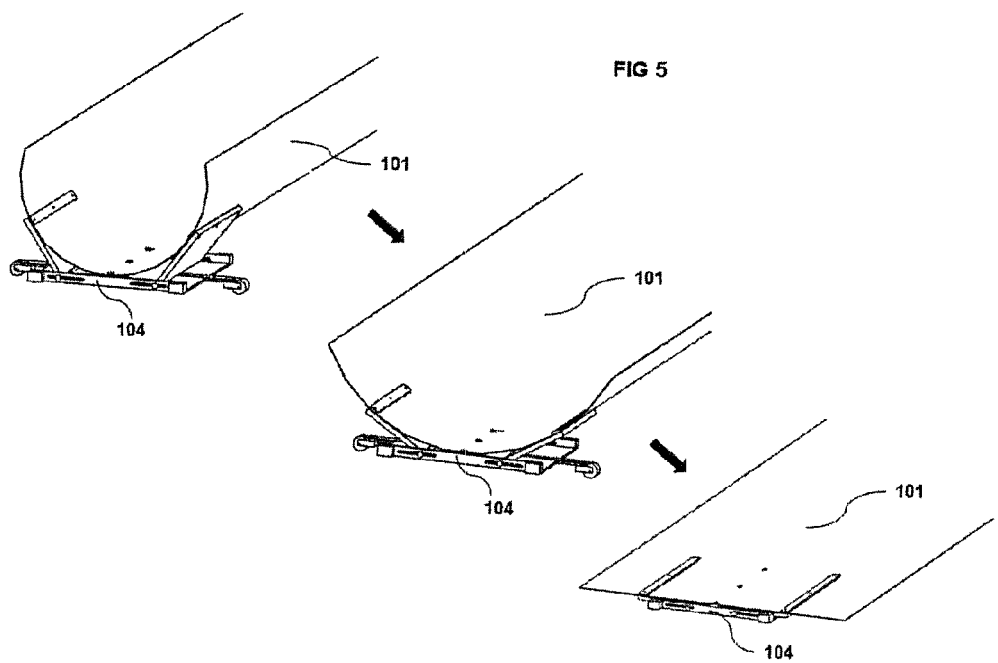
FIG. 5 shows a series of three perspective views showing how an embodiment of the disclosed apparatus closes in preparation for stowing of the boom.

FIG. 5 shows a series of three perspective views showing how an embodiment of the root stiffness mechanism 104 stows neatly and compactly behind the boom 101 as the boom is stowed.

FIG. 6 shows a perspective view of an embodiment of a partially deployed tubular slit boom 101 with the root stiffness mechanism 104 attached at the boom base. The tip of the boom 101 has been flattened and rolled to achieve a cylindrical stowed boom segment 103.

FIG. 7 shows a perspective view of an embodiment of a near fully stowed deployed tubular slit boom 101 with the deployable root stiffness mechanism 104 attached at the boom base. The boom 101 has been flattened and rolled to achieve a cylindrical stowed boom segment 103. The roof stiffness mechanism 104 is fully stowed achieving a low profile, compact, volume.

A method increasing the bending and torsional stiffness and strength of a tubular slit tube boom 101 is provided by embodiments of the disclosed root stiffness mechanism 104. This method comprises the steps of the reacting of external loads through the boom walls into a capturing structure, such as one having deploying side plates 106 and an associated base plate 105 as the boom is deployed, or other structural supports which provide the reacting of the external loads through the walls of the tubular slit tube boom 101. In this this method, a capturing structure generally conforms to the geometry of the tubular slit boom 101 as it changes from a stowed flat sheet structure in a rolled configuration to a deployed tubular structure. Generally, the capturing structure will have reaction plates, such as side plates 106, which, as the boom assumes the tubular structure, the reaction plates will be disposed against the outside wall of the boom, typically such that the reaction plates are tangential to the outside facing wall of the slit tube boom 101 when it reaches the deployed tubular structure.

While the above is a description of various embodiments of the present invention, further modifications may be employed without departing from the spirit and scope of the present invention. Thus the scope of the invention should not be limited according to these factors, but according to the following appended claims.

What is claimed is:

1. In a spacecraft having an onboard system wherein the onboard system has a stowage configuration and a deployment configuration and deployment of the onboard system is achieved, at least in part, by a tubular slit boom attached to the spacecraft by a structural interface, wherein the tubular slit boom comprises a thin-wall construction and has a storage configuration in which the tubular slit boom is flattened and rolled into a cylindrical stowage volume and a deployed configuration in which the tubular slit boom is extended to assume a tubular shape, a stiffness mechanism comprises:
    a base member which is engaging contact with a bottom surface of the tubular slit boom; and
    a reaction member which translates along the base member as the tubular slit boom transitions between the storage configuration to the deployed configuration and between the deployed configuration to the storage configuration, wherein the reaction member provides an opposing reactive force to a load conveyed through the thin-wall construction of the boom.

2. The stiffness mechanism of claim 1 wherein the reaction member comprises a first side plate and a second side plate wherein an end of the tubular slit boom is captured between the first side plate and the second side plate when the tubular slit boom is in the deployed configuration.

3. The stiffness mechanism of claim 2 wherein the first side plate and the second side plate are deployed into a position in which the first side plate and the second plate are tangentially disposed against the end of the tubular slit boom when the tubular slit boom is in the deployed configuration.

4. The stiffness mechanism of claim 3 wherein a biasing mechanism urges the first side plate and the second side plate against the end of the tubular slit boom as the tubular slit boom transitions into the deployed configuration.

5. The stiffness mechanism of claim 1 wherein a wall at an end of the tubular slit boom is in a flatted state in the storage configuration, with the wall disposed against a first side plate and a second side plate.

6. The stiffness mechanism of claim 5 wherein the first side plate and the second side plate each comprise a lower edge, wherein each lower edge is constrained with respect to the base member.

7. The stiffness mechanism of claim 6 wherein the baseplate comprises slots and the lower edge of the first side plate and the lower edge of the second side plate each comprise an outwardly extending pin, each outwardly extending pin disposed within a corresponding slot of the baseplate, each outwardly extending pin translatable within its corresponding slot.

8. The stiffness mechanism of claim 1 wherein the tubular slit boom comprises a strip which extends longitudinally through at least a portion of a length of the tubular slit boom, wherein the strip distributes at least a portion of a plurality of loads applied to the tubular slit boom.

9. In a spacecraft having an onboard system wherein the onboard system has a stowage configuration and a deployment configuration and deployment of the onboard system is achieved, at least in part, by a tubular slit boom attached to the spacecraft by a structural interface, wherein the tubular slit boom comprises a thin-wall construction and has a storage configuration in which the tubular slit boom is flattened and rolled into a cylindrical stowage volume and a deployed configuration in which the tubular slit boom is extended to assume a tubular shape, a method of increasing the bending and torsional stiffness of the tubular slit boom comprises the following steps:
    initiating deployment of the tubular slit boom so that the tubular slit boom assumes the tubular shape;
    capturing an end of the tubular slit boom within a structure having reaction plates, such that loads realized during a transition of the onboard system from the stowage configuration into the deployment configuration are subjected to opposing loads imposed by the reaction plates; and
    completing deployment of the tubular slit tube boom into the deployed configuration, the end of the tubular slit boom remaining captured between the reaction plates.

10. The method of claim 9 wherein the reaction plates comprise a first side plate and a second side plate wherein an end of the tubular slit boom is captured between the first side plate and the second side plate when the tubular slit boom is in the deployed configuration.

11. The method of claim 10 wherein the first side plate and the second side plate are deployed into a position in which the first side plate and the second plate are tangentially disposed against the end of the tubular slit boom when the tubular slit boom is in the deployed configuration.

12. The method of claim 11 wherein a wall at an end of the tubular slit boom is in a flatted state in the stowage configuration, with the wall disposed against the first side plate and the second side plate.

* * * * *